United States Patent [19]

Zardi

[11] Patent Number: 4,859,425
[45] Date of Patent: Aug. 22, 1989

[54] SYSTEM FOR IMPROVE THE MIXING OF REACTED GASES AND QUENCH GASES IN HETEROGENEOUS SYNTHESIS REACTORS

[75] Inventor: Umberto Zardi, Breganzona, Switzerland

[73] Assignee: Ammonia Casale S.A., Switzerland; a part interest

[21] Appl. No.: 54,743

[22] Filed: May 27, 1987

Related U.S. Application Data

[63] Continuation-in-part of Ser. No. 859,044, May 2, 1986, Pat. No. 4,755,362.

[30] Foreign Application Priority Data

Jun. 2, 1986 [CH] Switzerland ............... 02221/86

[51] Int. Cl.$^4$ ............... B01J 8/04; C01C 1/04
[52] U.S. Cl. ............... 422/148; 422/194; 423/360
[58] Field of Search ............... 422/148, 194; 423/360

[56] References Cited

U.S. PATENT DOCUMENTS

| | | | |
|---|---|---|---|
| 3,378,349 | 4/1968 | Shirk | 422/194 |
| 3,433,600 | 3/1969 | Christensen et al. | 422/194 X |
| 4,372,920 | 2/1983 | Zardi | 422/148 |

Primary Examiner—Christine M. Nucker
Assistant Examiner—Jill Johnston
Attorney, Agent, or Firm—Ostrolenk, Faber, Gerb & Soffen

[57] ABSTRACT

The general conditions of the thermal exchange are improved by ameliorating the mixing of reacted gases together with quench gases, in order to increase in the yields and to reduce the energy consumption in reactors used for heterogeneous synthesis (ammonia, methanol, etc.), consisting of an external shell, of an internal cartridge with catalytic baskets lying one above the other, at least one of such baskets being traversed axially by the reaction gas, and of means to feed the quench gas between the bottom of one basket and the top of the following basket, said gas mixing being carried out in a peripheral zone near the internal cartridge wall.

2 Claims, 3 Drawing Sheets

SYSTEM FOR IMPROVE THE MIXING OF REACTED GASES AND QUENCH GASES IN HETEROGENEOUS SYNTHESIS REACTORS

This application is a continuation-in-part of application Ser. No. 859,044, filed May 2, 1986, now U.S. Pat. No. 4,755,362.

BACKGROUND OF THE INVENTION

1. Field of the Invention

This invention refers to a system to improve the mixing of reacted gases and quench gases and to increase the yields and to reduce the energy consumption in reactors for the heterogeneous synthesis of ammonia and methanol in particular, consisting of: an external shell or pressure-resistant body; an internal cartridge that can form a conduit for the fresh reaction gas flow between the its external wall and the internal wall of the mentioned shell; catalyst baskets placed one above the other; and means to feed unreacted quench gas in order to cool down the reacted gases in the zone between the bottom of the upper catalyst bed and the upper loose surface of the catalyst bed situated below, the above mentioned reaction gas axially traversing at least one of the said catalytic beds.

2. Prior Art

Axial reactors of the above mentioned type were widely used in the pase and are often referred to as "Kellogg"-type reactors. These axial reactors were most often put into service during periods when the cost of energy was very low. With today's higher energy costs it is of great importance, especially in the industrial technology for producing a basic compound as NH3, to improve the efficiency of the synthesis reactor, i.e. to increase as much as possible and at a parity of other conditions, the conversion degree of the reaction gas during the passage through the catalyst beds. This is true not only for newly constructed plants in which the most advanced technology can be applied, but also for plants already in use, in which as explained above, the production costs are strongly influenced by the reactors' performances and must increase along with the rise in energy costs.

Of notable interest are actions or measures adapted to improve the reactors and to increase their efficiency with a consequent reduction in energy consumption.

In prior patents and patent applications, the applicant has suggested reactors of great interest with regard to the yields, operation costs and costs of putting them into production. For example, in the Swiss patent application No. 03238/85, corresponding to U.S. application Ser. No. 859,044, filed May 2, 1986, and No. 02100/85 in particular, an interesting modification to the axial quench-type Kellogg reactor has been proposed to transform them into radial reactors, which are able, among others, to employ smaller granular catalysts notably more active than the larger granular catalysts presently used in axial reactors, with consequent improvement of the reactor performances.

In the continuation of his systematic research in this field, the applicant has been successful in devising and carrying out further improvements to the assett and structure of these reactors with at least one catalytic bed which is axially traversed by the reaction gas; these improvements have proven to be very advantageous in increasing the efficiency of the mixing of the reacted and quench gases, and have thus optimized the general thermal conditions in which the reactions take place. This corresponds to a yield increase and to an energy consumption reduction.

The system, which is the subject of this invention, is characterized by the fact that the mixing of hot reacted gases with cold quench gases takes place in a peripheral zone near the internal cartridge wall.

The reactor, according to the invention, is now characterized by: a toroidal distributor with quench gas outlet near the periphery of the internal cartridge wall and by a double bottom underneath the lower portion of the catalyst bed's grid, for the conveying of the hot reacted gases exiting from the above mentioned bed to the peripheral quench gas outlet zone.

The various aspects and advantages of the invention will better appear from the following description of the preferred, but not limitative embodiments represented in the drawings:

DESCRIPTION OF THE PREFERRED EMBODIMENTS

Although the observations that follow are generally valid, reference is made in particular to the "Kellogg" axial-type quench reactors which have three or four adiabatic beds.

Figure 1:
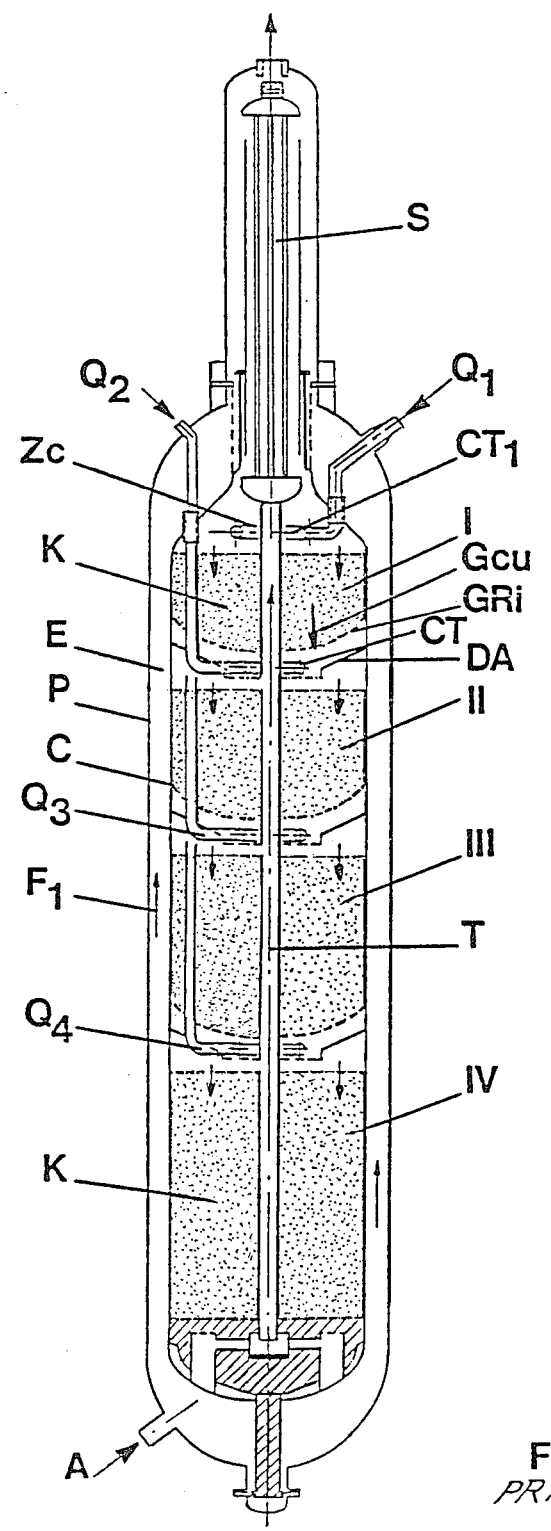
FIG. 1 is a view of a schematic and partial, longitudinal section of an already known type of axial reactor (for example a "Kellogg"-type reactor)

FIG. 1 represents a typical longitudinal cross-section of one of these conventional reactors consisting of a pressure shell P, a cartridge C of an internal diameter Dc, a channel for the flow of fresh gases up to the heat exchanger S, four catalyst beds I, II, III and IV which are each connected to a quench gas adductor Q2, Q3, and Q4 respectively, and terminate (for example) with a toroidal distributor CT.

The gas to be reacted is introduced into the bottom of the reactor through the feed opening A and flows upwards (arrow $F_1$) in the space E existing between the pressure vessel P and the internal or cartridge C containing the catalyst K. After the pre-heating in the top-exchanger S to the reaction temperature (at the expense of the reacted gas), the fresh preheated gas passes through the first catalyst bed I.

At the exit of the first bed I, the gas is cooled down by fresh quench gas Q2, and is passed through the second bed II and so on through the other following beds. The temperature control takes place between each bed (Li) and the next one (Li+1) through the mixing of the hot gas Gcu exiting the bed and an unreacted gas current, having a temperature lower than that of the reacted gas. In particular, given the notable reactor dimensions, the bottom grid GRi containing the catalyst K in each bed is of an elliptical type, in such a way as to increase the mechanical resistance. The gas exiting from the bottom of the elliptical grid GRi is collected and conveyed to the center of a special diaphram DA and here it is mixed with the cold gas distributed appropriately by each toroidal distributor CT. The gas mixed in this fashion then enters into the following bed at the desired temperature.

The mixing of the gas in this way is repeated for all the other catalyst beds (III, IV, etc.).

It clearly appears that the particular quench system above described requires a notable free volume (unoccupied by the catalyst) at the expense of the useful volume of the reactor (i.e. the volume occupied by the catalyst), and that the bed yields suffer from the poor mixing efficiency of the reacted gas with the quench gas.

Figure 2:
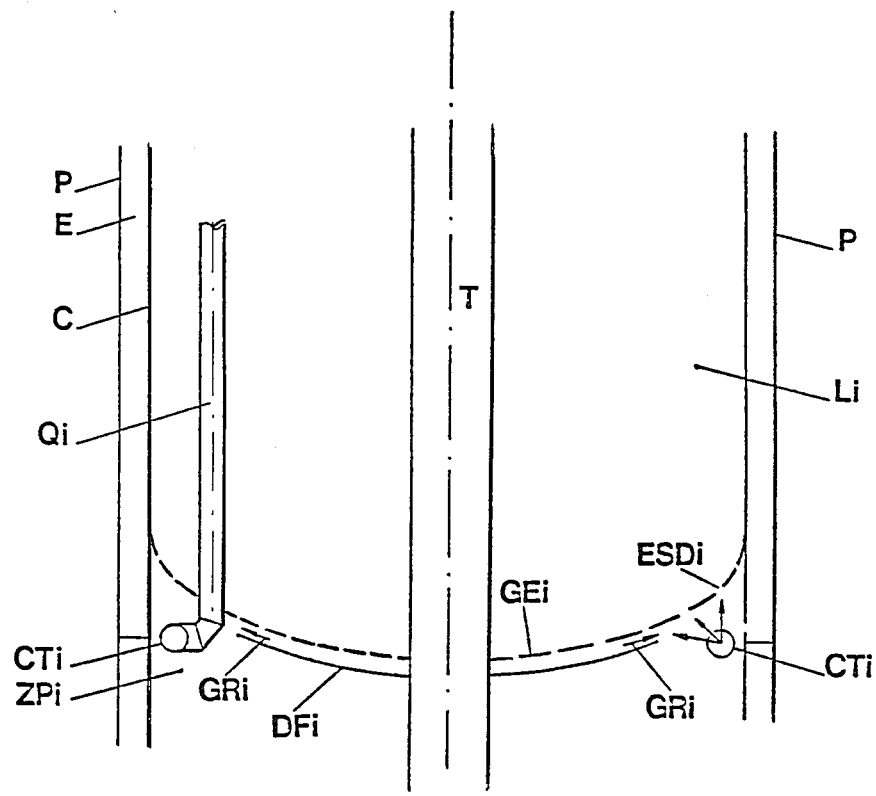
FIG. 2 is a view of a schematic section on an enlarged scale of a portion of the reactor underneath the bottom of a catalyst bed according to this invention.

It has now been found that it is possible to overcome these inconveniences by providing a different quench system as represented on an enlarged scale and in connection to the bottom of a bed Li in FIG. 2.

According to the invention, the toroidal distributor CTi (quench ring) is now transferred from the central zone Zc (FIG. 1) to that of the peripheral zone ZPi (FIG. 2) preferably and critically in correspondence to the extrados ESDi of the elliptical grid GEi (i.e., in the most peripheral zones utilized until now), and the hot reacted gas is returned to the outside through an appropriate double bottom DFi. It is thus possible to increase the available space for the catalyst and therefore the total quantity of it to be inserted in the reactor (in a four-bed reactor, the quantity gained is four times the amount recovered in each bed). This gain is surprisingly accompanied by the fact that the admixing of the hot reacted gas Gcu with the quench gas Qi is now extremely efficient; in fact, it has been ascertained that this mixing is particularly favoured in the restricted peripheral zone Zp (with respect to that which took place in the ample central passage zones Zc).

A traditional "Kellogg" reactor, appropriately modified according to this invention, can be charged with at least 10% more catalyst, which amounts to an appreciable conversion increase.

Figure 3:
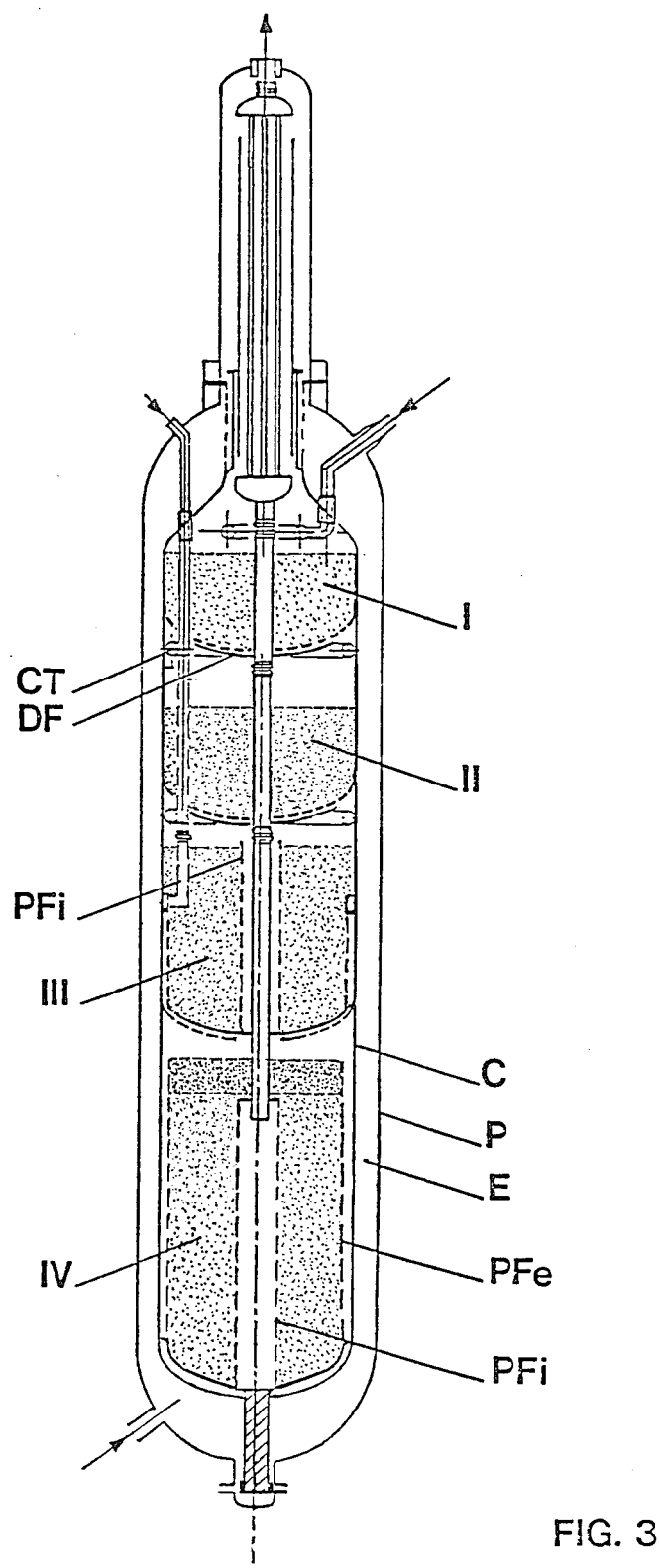
FIG. 3 is a view of a longitudinal, schematic section of a reactor including the improvement on at least one catalyst bed according to this invention, and the modification of at least another catalytic bed according to the above patent applications.

FIG. 3 represents a Kellogg reactor modified according to this invention, in which the first I and second bed II are axial (not transformed), whereas the remaining two beds have been transformed as per the applicant's earlier patent applications (transformation of beds III and IV as beds with axial flow into beds with radial gas flow).

Obviously, it is possible to have one axial bed and three remaining radial beds (1+3), or two axial beds and two radial beds as indicated in FIG. 3 (2+2), or three axial beds and one radial bed (3+1).

I claim:

1. A reactor for heterogeneous synthesis comprising
   (a) an external pressure resistant shell;
   (b) a cylindrical cartridge axially positioned in said shell and spaced apart from the walls of said shell;
   (c) a plurality of vertically spaced apart catalyst beds disposed in said cartridge, at least the uppermost bed being adapted to permit the flow of synthesis gas downwardly therethrough;
   (d) toroidal distributor means for introducing a plurality of quench gas streams into at least the outer periphery of the space between said uppermost bed and the bed next below it, said distributor means being positioned along the periphery of said space; and
   (e) means for directing the flow of gas exiting at least said uppermost bed towards the outer periphery of said space so that it impinges on said plurality of said quench gas streams at said outer periphery, said means (e) comprising an elliptical double bottom of said bed, said double bottom comprising an upper perforate bottom for retaining said bed and a solid bottom below said perforate bottom and spaced apart therefrom, the space between said perforate bottom and said solid bottom defining a channel for directing the gas exiting from said bed toward said periphery, said toroidal quench gas distributor (d) having outlets in correspondence with the extrados of said elliptical bottom.

2. A reactor according to claim 1 comprising also at least one catalyst bed adapted to be traversed radially by gas exiting from a bed positioned above said radially traversable bed.

* * * * *